No. 681,885. Patented Sept. 3, 1901.
M. T. MYERS.
JAR AND JAR COVER.
(Application filed Feb. 14, 1901.)

(No Model.)

Witnesses
M. T. Myers, Inventor.
by C. A. Snow & Co.
Attorneys

UNITED STATES PATENT OFFICE.

MARY TOWNSEND MYERS, OF LAMOILLE, IOWA.

JAR AND JAR-COVER.

SPECIFICATION forming part of Letters Patent No. 681,885, dated September 3, 1901.

Application filed February 14, 1901. Serial No. 47,329. (No model.)

*To all whom it may concern:*

Be it known that I, MARY TOWNSEND MYERS, a citizen of the United States, residing at Lamoille, in the county of Marshall and State of Iowa, have invented a new and useful Jar and Jar-Cover, of which the following is a specification.

This invention relates to jar-closures; and has for its object to provide an improved closure especially designed for fruit-jars, so as to form an air-tight closure therefor, and thereby prevent fermentation of the contents of the jar.

It is furthermore designed to dispense with external fastenings for the closure, so as to render the jar free from projections, and also to facilitate and simplify the tightening of the closure, and finally to arrange for conveniently removing the lid or closure without requiring the application of much force.

With these and other objects in view the present invention consists in the combination and arrangement of parts, as will be hereinafter more fully described, shown in the accompanying drawings, and particularly pointed out in the appended claim, it being understood that changes in the form, proportion, size, and minor details may be made within the scope of the claim without departing from the spirit or sacrificing any of the advantages of the invention.

Figure 1:
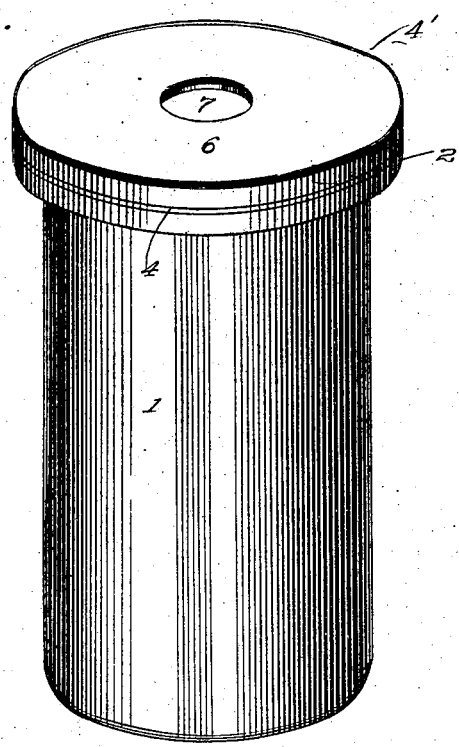
Figure 2:
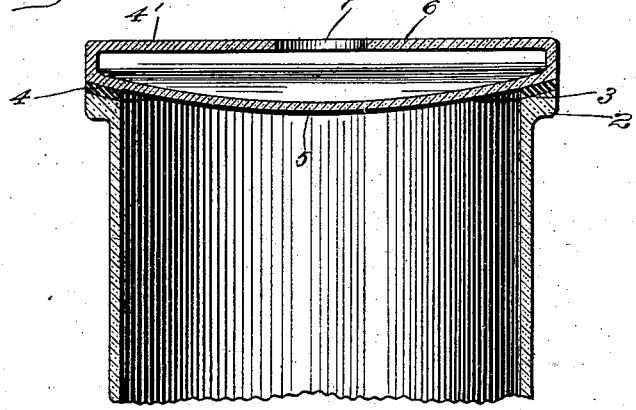

In the drawings, Figure 1 is a perspective view of a fruit-jar constructed in accordance with the present invention. Fig. 2 is a detail transverse sectional view taken through the jar-closure.

Like characters of reference designate corresponding parts in both figures of the drawings.

Referring to the drawings, 1 designates the body of the improved jar, which is of cylindrical shape, so as to have a large mouth or opening to facilitate the introduction and removal of fruit. The upper edge of the jar is thickened, so as to form an outer marginal flange 2, the upper side of which is beveled inwardly and downwardly, as indicated at 3. A suitable elastic packing-ring 4 is seated upon the beveled top or upper edge of the marginal flange, which latter also forms a handle for lifting the jar.

The lid or closure 4' is made of glass and is also hollow, having a convex bottom or lower side 5 and a flat top 6, which is provided with a central opening 7, of suitable size, so as to permit of water being poured into the hollow top or cap, for a purpose as will be hereinafter described.

When placing fruit within jars, each of the latter is filled up to the inner edge of the beveled marginal flange, after which the lid or cover is applied and pressed firmly down upon the packing-ring, whereby the center depressed portion of the convex bottom will sink into the fruit and displace the same radially outward in all directions, thereby dispelling all of the air from the interior of the jar and causing a suction which will hermetically seal the cover and dispense with all other external fastenings therefor. It will of course be understood that the displaced fruit will occupy the space between the inner marginal edge of the packing-ring and the adjacent portion of the cover, whereby none of the fruit is forced out of the jar.

In order that the cover may be conveniently removed, it has been made hollow or cup-shaped, so that hot water may be poured into it for the purpose of expanding the cover independently of the jar, thereby breaking the frictional or adhesive bond between the two parts and permitting of the cover being slid laterally from the jar without requiring the application of much force.

From the foregoing description it is apparent that the present jar has no exterior cover-fastenings to prevent close packing of a plurality of jars and requiring the expenditure of considerable time and force in applying and removing the lid or cover. It will also be noted that the convexity of the bottom of the cover is such as to have the central portion thereof lie below the plane of the inner marginal edge of the beveled portion of the marginal flange in order that the central portion of the cover may sink into the fruit, and thereby expel all of the air from the jar, whereby fermentation of the fruit is prevented.

Upon examination of Fig. 2 it will be seen that the convex bottom of the cover is beveled inwardly and downwardly toward the center from the outer margin thereof, thereby providing a central pendent air-dispeller, which is surrounded by a beveled marginal seat, which corresponds to the beveled seat upon the mouth of the jar, and the cover is free from pendent marginal projections which would close the space between the two seats during the application of the cover, whereby the cover may be readily slid laterally from the mouth of the jar when the cover has been expanded by the introduction of hot water into the socket in the top thereof.

What is claimed is—

A fruit-jar, having its upper marginal edge beveled inwardly and downwardly to form a cover-seat, and a cover formed of material which is expansible under the action of heat and provided in its top with a socket for the reception of a heated liquid, the bottom of the cover being convexed to correspond with the beveled seat, the external diameter of the cover being equal to that of the seat, the latter being free from upstanding marginal projections, and the cover being free from pendent marginal projections, whereby the joint between the cover and the jar is free from overlapped parts and the cover may be slid edgewise from the seat.

In testimony that I claim the foregoing as my own I have hereto affixed my signature in the presence of two witnesses.

MARY TOWNSEND MYERS.

Witnesses:
 JOSEPH M. BISHOP,
 BENJ. PACKER.